Feb. 28, 1939.  A. A. AICHER  2,148,670
APPARATUS FOR CONTROLLING THE TEMPERATURE
OF EXOTHERMIC REACTION CHAMBERS
Filed Nov. 18, 1936
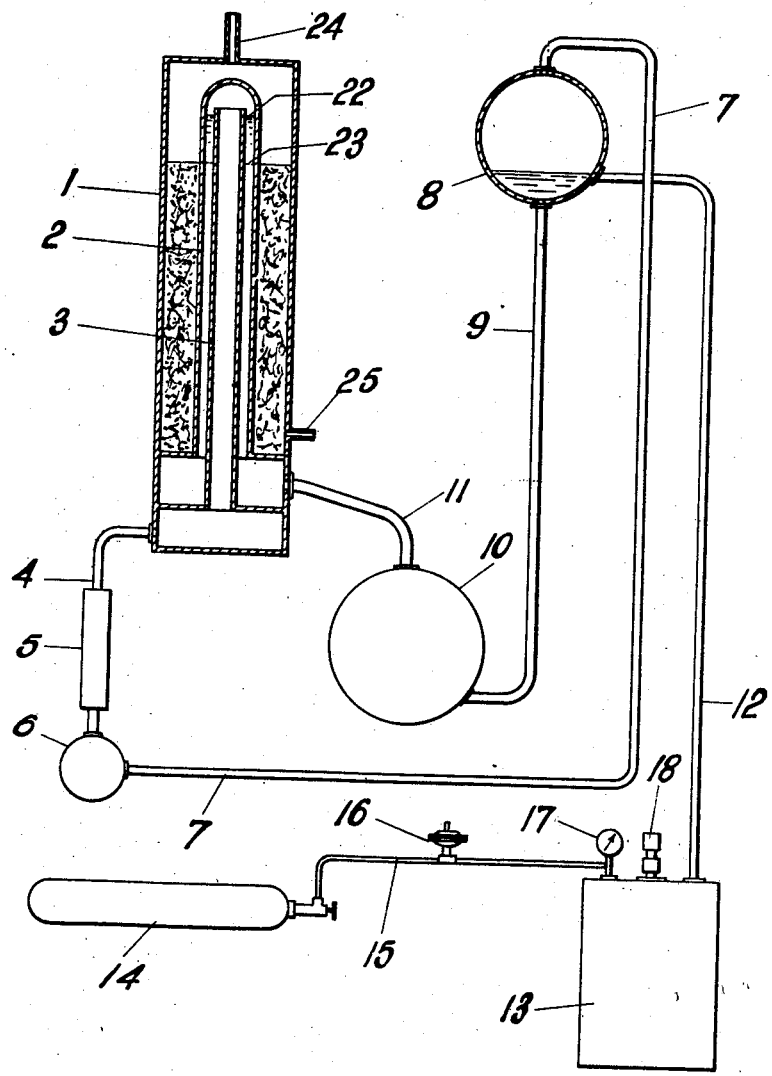
Inventor:
Alfred August Aicher,
By Potter, Pierce & Scheffler,
Attorneys.

Patented Feb. 28, 1939

2,148,670

UNITED STATES PATENT OFFICE 2,148,670

APPARATUS FOR CONTROLLING THE TEMPERATURE OF EXOTHERMIC REACTION CHAMBERS

Alfred August Aicher, Wimbledon, London, England, assignor, by mesne assignments, to The M. W. Kellogg Company, Jersey City, N. J., a corporation of Delaware Application November 18, 1936, Serial No. 111,549
In Great Britain November 18, 1935

2 Claims. (Cl. 23—288)

This invention relates to a method and apparatus for controlling the temperature of chambers in which an exothermic reaction is taking place.

According to the present invention the temperature of the reaction chamber is maintained at the desired point by cooling it by the evaporation of a liquid and adjusting the temperature at which the liquid boils. The liquid used for cooling is naturally so chosen that its boiling point corresponds approximately to the temperature at which the reaction chamber is to be maintained; by varying the pressure under which the liquid boils, the temperature can be adjusted within fine limits.

Apparatus in accordance with the invention for carrying out this method of temperature control comprises a reaction chamber, a boiling chamber in thermal contact with the reaction chamber, means for heating a liquid to its boiling point and introducing it into the boiling chamber and adjustable means for controlling the pressure in the boiling chamber. Preferably means are provided for condensing the vapour produced in the boiling chamber and leading it back into the boiling chamber, so that a closed circuit is formed. Other features of the invention will appear from the following description.

Apparatus for carrying out the invention is shown in the accompanying drawing, which is of a somewhat diagrammatic character. In the apparatus shown, the reaction chamber and the boiling chamber are formed by three coaxial tubes 1, 2 and 3 the space between tubes 1 and 2 forming the reaction chamber and the space between tubes 2 and 3 forming the boiling chamber. At their lower ends tubes 2 and 3 are connected together and provided with an inlet for the liquid. The upper end of tube 2 is closed, while the upper end of tube 3 is open. The liquid in the boiling chamber boils off, the latent heat of vapourisation being taken from the reaction chamber. The vapour thus produced passes down through tube 3 to an outlet, from which it passes through a pipe 4 to a condenser 5. The liquid from the condenser is raised by a pump 6 through a pipe 7 to a receiver 8, from which it flows by gravity through a pipe 9 to a heater 10, which raises its temperature to boiling point, and thence through a pipe 11 back into the boiling chamber. The level of liquid in the boiling chamber depends on the level in the receiver 8 and this latter level is maintained by an overflow pipe 12 which leads from the receiver to a liquid trap 13. The liquid trap also acts as a pressure chamber by means of which the pressure in the cooling system (and thus the boiling point of the cooling liquid) can be controlled. To this end, the pressure chamber 13 is connected through a pipe 15 provided with a regulator valve 16 with a source of compressed gas 14 and is provided with a pressure gauge 17 and with a safety valve 18. Alternatively, or in addition, the pressure chamber can be connected to a vacuum pump, so that the pressure in the cooling system (and thus the boiling point of the liquid) can be reduced.

Owing to the fact that the co-efficient of transmission of heat to a liquid from a surrounding wall is much greater when the liquid is boiling than when it is not, the temperature difference between the reaction chamber and the cooling liquid is reduced to a minimum when the system of the present invention is employed. The system thus presents considerable advantages over systems which depend simply upon a circulating liquid.

When the liquid in the annular space between tubes 2 and 3 is actually boiling, its apparent density will be less than the actual density of the liquid, owing to the presence of vapour bubbles in the liquid and its surface 22 will accordingly lie above the level of the liquid in the receiver 8. If now the pressure within the cooling system is increased in order to raise the boiling point of the liquid, and thus the temperature at which the reaction chamber is maintained, the liquid will temporarily cease to boil. Owing to the disappearance of the vapour bubbles, the apparent density of the liquid in the annular space will increase and consequently the surface of the liquid column will fall to the position indicated in dotted lines at 23. The upper part of the tube 2 is thus no longer in contact with the cooling liquid and can effect no appreciable cooling of the reaction chamber. The apparatus described is particularly intended for controlling the temperature of catalytic reactions. In such cases it is important that the catalyst itself should not be overheated and it is therefore arranged in a cylindrical bed immediately surrounding the cooling tube 2. It will be clear, however, from the foregoing explanation that in certain circumstances the upper part of the cooling tube may cease to have any appreciable cooling effect. Accordingly the catalyst should, as is indicated in the drawing, be arranged around the lower part only of the tube 2, which projects above the top of the catalytic bed. This ensures that the catalyst is always adequately cooled and overheating is prevented. This arrangement has also a further advantage. The fluid which is to take part in the reaction should when it reaches the catalytic bed be at a temperature as near as possible to that of the catalyst itself. A preheater can, of course, be used to raise the temperature of the gas or other fluid to the required level, but it is always possible that the temperature may vary between the preheater and the catalytic bed. With the arrangement above described, however, the protruding portions of the tube 2 (which are normally at substantially the same temperature as the catalyst) adjust the temperature of the incoming gas (which preferably enters at the upper end of the reaction chamber through a tube 24 and leaves at the lower end through a tube 25) in a most efficient manner, before it reaches the catalytic bed.

The condenser 5 of the apparatus above described may take the form of a heat exchanger in which the heat of the vapour is given up and utilised for heating purposes of any kind, or it may be replaced by a vapour engine of any suitable construction.

I claim:

1. Apparatus for controlling exothermic reactions comprising a reaction chamber containing a catalytic bed, a boiling chamber defined between a wall of the reaction chamber and a second wall closely adjacent to the wall of the reaction chamber, said boiling chamber extending at least from the bottom to above the top of the catalytic bed, heating means for heating a liquid to its boiling temperature, means for introducing the heated liquid into the lower part of said boiling chamber, means for withdrawing vapors from the top of the boiling chamber, means for condensing said vapors, and means for returning the condensed vapors to said heating means, the heating means, boiling chamber, means for withdrawing vapors, means for condensing vapors and means for returning condensed vapors to the heating means providing a closed circuit for the liquid and the vapors thereof serving to control the temperature of reaction chamber, said circuit including also hydrostatic means for maintaining the level of the liquid in the boiling chamber above the level of the catalytic bed, but below the top of the boiling chamber whereby the height of the body of liquid in the boiling chamber is at least coextensive with the catalytic bed.

2. Apparatus as defined in claim 1 comprising means associated with said closed circuit for the liquid and vapors thereof which serves to control the temperature of the reaction chamber, for regulating the pressure on the liquid within the boiling chamber.

ALFRED AUGUST AICHER.